United States Patent [19]

Oliver

[11] Patent Number: 4,748,384
[45] Date of Patent: May 31, 1988

[54] ERROR SIGNAL CANCELLATION FOR TOP/BOTTOM PINCUSHION CORRECTION CIRCUIT

[75] Inventor: Kirk Oliver, Forest Park, Ill.

[73] Assignee: Zenith Electronics Corporation, Glenview, Ill.

[21] Appl. No.: 1,060

[22] Filed: Jan. 6, 1987

[51] Int. Cl.[4] .................. H01J 29/56; H01J 29/70; H01J 29/72
[52] U.S. Cl. ............................ 315/371; 315/389; 315/403
[58] Field of Search .............. 315/371, 370, 387, 389, 315/403, 397

[56] References Cited
FOREIGN PATENT DOCUMENTS
0058312  5/1977  Japan ............................ 315/370

*Primary Examiner*—Theodore M. Blum
*Assistant Examiner*—Gregory C. Issing

[57] ABSTRACT

A top/bottom pincushion correction transformer injects a horizontal rate correction signal in series with a vertical yoke that is driven from a vertical amplifier that has a non-inverting and an inverting terminal. A feedback arrangement includes a voltage sensing resistor for supplying a voltage indicative of the current flow in the yoke to the non-inverting terminal of the amplifier. The primary winding of a pincushion transformer is connected in series with a current limiting resistor and their junction is connected by a bridging resistor to the voltage sensing resistor. The voltage developed across the voltage developing resistor is of opposite polarity to the voltage developed across the current limiting resistor for offsetting the same.

1 Claim, 1 Drawing Sheet

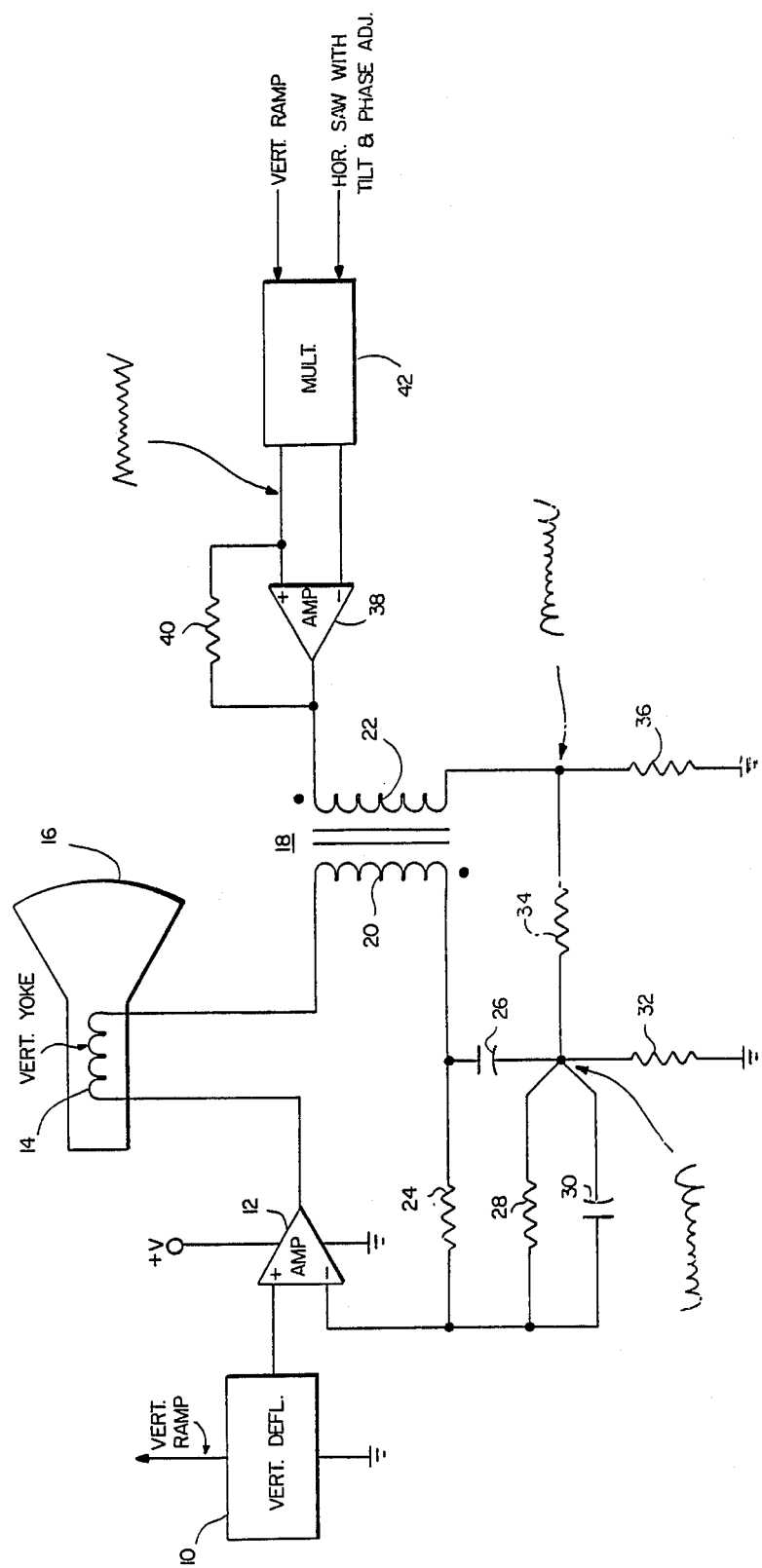

ERROR SIGNAL CANCELLATION FOR TOP/BOTTOM PINCUSHION CORRECTION CIRCUIT

CROSS REFERENCE TO RELATED APPLICATIONS

This application is related to application Ser. No. 000,694, filed 1/6/87, entitled INDEPENDENT TOP/BOTTOM PINCUSHION CORRECTION CIRCUIT (D5586), in the name of Kirk Oliver and assigned to Zenith Electronics Corporation.

BACKGROUND OF THE INVENTION AND PRIOR ART

This invention relates generally to top and bottom pincushion correction circuits and specifically to such circuits that incorporate active vertical amplifiers having non-inverting and inverting inputs and pincushion correction apparatus that injects a correction current into the vertical deflection yoke.

As mentioned in the copending application, the advent of cathode ray tube (CRT) video monitors used in conjunction with computers for displaying alphanumeric and precise graphical data has created a need for closer control of the raster shape. The flat-faced color CRT has greatly increased the difficulty of pincushion correction. Active pincushion correction circuits and accurate deflection amplifiers, that closely control deflection currents, are ideally suited to pincushion correction. The deflection amplifier includes a feedback circuit that senses the current in the deflection yoke and develops a voltage that is fed to the inverting input terminal of the vertical amplifier for accurately controlling the deflection current. Such a vertical amplifier, when used in conjunction with the top/bottom pincushion correction circuit disclosed and claimed in the copending application, results in the top/bottom pincushion correction signal being detected by the sensing resistor in the feedback circuit for the vertical amplifier. The vertical amplifier "sees" the pincushion correction signal as an error signal and attempts to negate its effect. The vertical amplifier cannot follow the frequency of the pincushion correction signal and distortion is introduced. The distortion is not significant; yet, with the precise raster control desired in a flat tension mask CRT environment, for example, any distortion is undesirable.

OBJECTS OF THE INVENTION

A principal object of the invention is to provide an improved vertical deflection circuit.

Another object of the invention is to provide a vertical deflection circuit that incorporates error signal cancellation for induced top/bottom pincushion correction signals.

BRIEF DESCRIPTION OF THE DRAWING

These and other objects and advantages of the invention will be apparent upon reading the following description in conjunction with the drawing, the single FIGURE of which is a partial block, partial schematic diagram of a vertical deflection circuit incorporating the invention.

DESCRIPTION OF THE PREFERRED EMBODIMENT

Referring to the drawing, a vertical deflection circuit 10 provides a vertical deflection signal to the positive (non-inverting) input of a vertical deflection amplifier 12, the output of which is connected in series with a vertical yoke 14 that is positioned on the neck of a CRT 16. For purposes of simplicity, the horizontal deflection circuits are not illustrated. The other end of yoke 14 is connected to the secondary winding 20 of a pincushion transformer 18 and to the junction of a resistor 24 and a capacito 26. A voltage sensing resistor 32 connects the other end of capacitor 26 to ground. The negative (or inverting) terminal of amplifier 12 is connected to the other end of resistor 24. This terminal is also connected to the parallel combination of a resistor 28 and a capacitor 30, the other junction of which is connected to the junction of capacitor 26 and resistor 32. All of the above-mentioned elements comprise a feedback circuit for conveying the voltage developed by voltage sensing resistor 32, which voltage is indicative of the current flow in yoke 14, to the negative input terminal of amplifier 12. The amplifier arrangement accurately controls the current flow in the yoke as a function of the signal applied to its positive input terminal.

The primary winding 22 of pincushion transformer 18 is supplied by the output of an amplifier 38 that is differentially fed from a multiplier 42. A feedback resistor 40 connects the output of amplifier 38 to its positive input in conventional fashion. One input to multiplier 42 is a vertical ramp signal and another input is a horizontal ramp signal whose amplitude, tilt and phase may be adjusted for top/bottom pincushion correction. The output of multiplier 42 is a conventional bowtie pincushion correction signal having a waveform that is substantially as shown. That signal develops the well-known top/bottom pincushion correction current in transformer winding 22 and a voltage waveform substantially as illustrated across a current limiting resistor 36 that is connected from the bottom of transformer winding 22 to ground. A bridging resistor 34 is connected between current limiting resistor 36 and voltage sensing resistor 32. With the polarities of the windings as illustrated by the dots adjacent their respective ends, the pincushion correction signal induced into secondary winding 20 in series with vertical yoke 14 will develop a voltage across voltage sensing resistor 32 in phase opposition to the voltage developed across current limiting resistor 36. The potential developed across current limiting resistor 36 thus offsets the voltage developed across sensing resistor 32. It will be appreciated, of course, that the potential developed in response to the normal deflection current flow (caused by the input signal at the positive terminal of vertical amplifier 12) is not cancelled. Thus, the top/bottom pincushion correction current does not give rise to an error signal at the negative terminal of vertical amplifier 12 and amplifier 12 does not attempt to correct it. Bridging resistor 34 and current limiting resistor 36 are selected to completely offset the sensed pincushion correction signal voltage developed at the junction of resistor 32 and capacitor 26.

It is recognized that those skilled in the art will perceive other variations on the disclosed embodiment of the invention without departing from its true spirit and scope. The invention is to be limited only as defined in the claims.

What is claimed is:
1. A vertical deflection circuit comprising:
   a vertical amplifier having an inverting input terminal and a non-inverting input terminal;

a vertical deflection yoke having one terminal coupled to the output of said vertical amplifier;

feedback means including a voltage sensing resistor for developing a voltage representative of the current flowing in said yoke and for applying it to said inverting terminal of said vertical amplifier;

a top/bottom pincushion correction circuit including a pincushion transformer having a primary winding and a secondary winding;

a current limiting resistor connected in series with said primary winding and developing a voltage corresponding to said correction current;

said secondary winding having one terminal connected to the other terminal of said yoke and another terminal coupled to said feedback means; and a bridging resistor connected between said voltage sensing resistor and said current limiting resistor, said primary and secondary windings being poled such that the voltage developed across said voltage sensing resistor as a result of said top/bottom correction current in said yoke is opposite in phase to, and therefore offset by, the voltage developed across said current limiting resistor.

* * * * *